United States Patent [19]
Tomany et al.

[11] 3,793,809
[45] Feb. 26, 1974

[54] VENTRI-SPHERE HIGH ENERGY SCRUBBER

[75] Inventors: James P. Tomany, Darten; George H. Cash, Wilton, both of Conn.

[73] Assignee: Universal Oil Products Company, Des Plaines, Ill.

[22] Filed: Dec. 21, 1972

[21] Appl. No.: 317,346

Related U.S. Application Data

[60] Division of Ser. No. 824,365, May 5, 1969, which is a continuation of Ser. No. 625,260, March 22, 1967, abandoned.

[52] U.S. Cl............................ 55/91, 55/93, 55/95, 55/223, 55/233, 55/241, 55/257, 261/DIG. 54, 261/62, 261/94, 261/112
[51] Int. Cl............................................. B01d 47/02
[58] Field of Search............................ 55/90–95, 223, 55/226, 227, 233, 240, 241, 259, 260, 257; 261/DIG. 54, 79.1, 94, 95, 112, 115, 62

[56] References Cited
UNITED STATES PATENTS

| | | | |
|---|---|---|---|
| 2,484,277 | 10/1949 | Fisher | 55/223 |
| 3,302,372 | 2/1967 | Hynson et al. | 55/71 |
| 3,085,793 | 4/1963 | Pike et al. | 261/112 |

FOREIGN PATENTS OR APPLICATIONS

| 45,132 | 11/1961 | Poland | 261/DIG. 54 |
|---|---|---|---|

Primary Examiner—Bernard Nozick
Attorney, Agent, or Firm—James R. Hoatson, Jr.; Philip T. Liggert

[57] ABSTRACT

An improved multiple stage and compact form of venturi type scrubber unit adapted for cleaning gaseous streams laden with extremely fine particulates, with such unit providing a downflow of the gaseous stream through a venturi throat section along with recycle slurry to effect high velocity wetting of entrained particles. The discharge of wetted gas and particles is, in turn, downwardly from an elongated diffuser section or energy regain tube toward a lower slurry collecting zone whereby the gaseous stream flow is caused to reverse 180° and then pass upwardly through loose light weight mobile packing maintained in between vertically spaced apart perforate retainer means to effect particulates and mist removal in the presence of a counter-currently flowing liquid stream being introduced above such removal zone. A preferred embodiment utilizes a flexible venturi throat section which is mechanically adjustable to provide a variable cross-sectional area that will be changed responsive to variations in gas and liquid volumes and in turn sustain a substantially constant pressure drop across such throat section. Also, the unit may incorporate a plurality of sloping vane means above the mobile packing zone to effect further liquid de-entrainment from the clean gas stream prior to its discharge from the unit.

5 Claims, 2 Drawing Figures

3,793,809

VENTRI-SPHERE HIGH ENERGY SCRUBBER

This is a division of application Ser. No. 824,365, filed May 5, 1969, which in turn is a continuation of application Ser. No. 625,260, filed on March 22, 1967, now abandoned.

The present invention is directed to an improved high energy venturi type scrubber unit adapted for removing extremely fine particulates from a laden gaseous stream. More specifically, there is provided a first stage downflow through a venturi section with wetted particles being discharged into a lower slurry collecting section and then a reverse flow up through a second stage scrubber zone having a light weight mobile packing to provide surface area for countercurrent scrubbing in the presence of a descending sprayed liquid.

It is recognized that the use of venturi type scrubbers is not new for cleaning particle laden gaseous streams, particularly since they are of advantage in effecting an efficient wetting of the entrained particles in a restricted area where the gas velocity is high. Actually, the high velocity effect of the venturi results in a breakdown of the liquid stream being introduced just ahead of the venturi throat section such that there is a highly efficient contacting and liquid entrapment of all of the entrained particles. The venturi unit is of advantage for both the plus-micron and sub-micron particles; however, greater pressure drop conditions may be required through the venturi for the smaller submicron size particulates. The pressure drop can be varied by changing the gas velocity and/or changing the liquid injection rate. Alternatively, there can be a changing of the size of the venturi throat section to suit variations in gas or liquid flow rates or in the size and nature of the entrained particulates.

The presently known commercial forms of venturi scrubbers are generally of a single stage type of operation or discharge into cyclone separators which must handle a droplet laden stream. In some cases, mesh or blanket type mist extractor sections are used downstream from the venturi and separator sections. However, blanket type extraction sections are subject to plugging and all of the related problems encountered with fixed bed packing or filter arrangements.

SUMMARY OF THE INVENTION

It may be considered a principal object of the present invention to provide a two-stage particulate scrubbing system, where a down-flow high energy venturi scrubber section is used in a first stage and an up flow provided in a second stage to have the gas pass countercurrently to a descending liquid flow in the presence of randomly moving light weight contact elements, all within a unit design arrangement.

It is also an object of the present invention to provide a two-stage venturi-mobile element scrubber system which incorporates a flexible venturi throat section whereby the cross-sectional area thereof can be changed to maintain a substantially constant, or desired, pressure drop through the venturi stage for variation in operating conditions.

In a broad embodiment, the present invention provides a two-stage venturi-scrubber unit for effecting the removal of finely divided particulates from a waste gas stream, and comprises in combination, a vertically disposed housing having an upper ladened-gas inlet discharging downwardly into a depending funnel section connecting to a restricted area venturi throat section, the upper end portion of said funnel section being spaced from the lower end of said inlet and having a peripheral weir adapted to provide liquid overflow into said funnel section from encompassing liquid distributing trough means, liquid inlet means to the latter to maintain a liquid level therein, an open-ended venturi diffuser section or energy regain tube extending downwardly from said venturi throat section and discharging into a lower liquid retaining sump section, spaced apart horizontally disposed perforate members positioned above the lower end of said venturi diffuser section and adjacent to the latter in said housing, said members holding a multiplicity of low density movable contact elements adapted to provide a second stage scrubbing and particulates and mist extraction section for the gaseous stream flow after it has reversed its direction from the lower end of said diffuser section and from said sump section, liquid distribution means positioned above the upper end portion of said mist extraction section to effect countercurrent gas-liquid flow in such section over said contact elements therein, cleaned-gas outlet means from said housing spaced above said extraction section, and slurry withdrawal means from said sump section in the lower end of said housing.

In a preferred and more specific embodiment, there is provided a flexible venturi throat, which may be made of rubber or other flexible material, and mechanically movable throat restricting means which is mounted adjacent to, or encompassing the throat section, such that there may be the desired automatic adjustment thereof in order to vary the cross-sectional area of the venturi throat section. Generally, as noted briefly hereinbefore, in order to maintain the most efficient operation of the unit, it is desirable to maintain a substantially constant pressure drop through the venturi section, or have means for adjusting pressure drop to suit changing operating conditions. Thus, a mechanically movable throat adjustment means is made operable responsive to changes in gas and liquid volumes passing through the unit so as to obtain a substantially constant pressure drop through the throat section. Alternatively, with sub-micron size entrained particulates, it may be necessary to have higher pressure drop through the venturi section so as to insure greater atomization of entrained liquid and improved wetting of the fine particulates through the venturi section. As a result, a flexible variable sized throat section permits a rapid adjustment in the system operation which will provide a greater pressure drop through the venturi section to in turn accommodate a gas flow carrying extremely fine, sub-micron size particles.

In the second stage scrubber section, where there is an upward gaseous flow moving countercurrently to a descending liquid flow through a contact bed of movable contact elements, there are preferably used light weight or low density elements which have considerable surface area. For example, such elements may comprise spherical polyethylene balls whereby they are readily made fluidizable and can move in random motion between the upper and lower perforate plates defining the second stage scrubbing zone. A preferred arrangement also provides that the light weight fluidizable contact elements, plastic spheres, or whatever, shall fill the contacting section to less than 50 percent of its depth when they are in a non-fluidized state, such that there is adequate free-board space in the entire section to permit a random, turbulent fluidized action for all of the contact elements in the moving bed thereof.

Still another feature for an improved preferred embodiment of the present two-stage type of venturi-scrubber, is the utilization of a "spinner section" above and downstream from the upper end of the zone containing the mobile contact elements such that any entrained liquid carrying upwardly with the gas flow stream will be caused to be thrown against the inner wall of the housing of conduit means carrying a resulting spiralling gas flow upwardly to an outlet duct. Generally, the means providing for the spinning of the gas stream in a spiralling flow path may comprise a plurality of angularly positioned vanes which will bring about the desired spiral flow and spin out the entrained liquid droplets.

Reference to the accompanying drawing and the following description thereof will serve to illustrate diagrammatically one embodiment of the present improved high energy venturi-scrubber system and additional advantages which may be obtained in connection therewith by providing a first stage down flow venturi section and a reverse up-flow through a movable packing second state scrubbing section.

Figure 1:
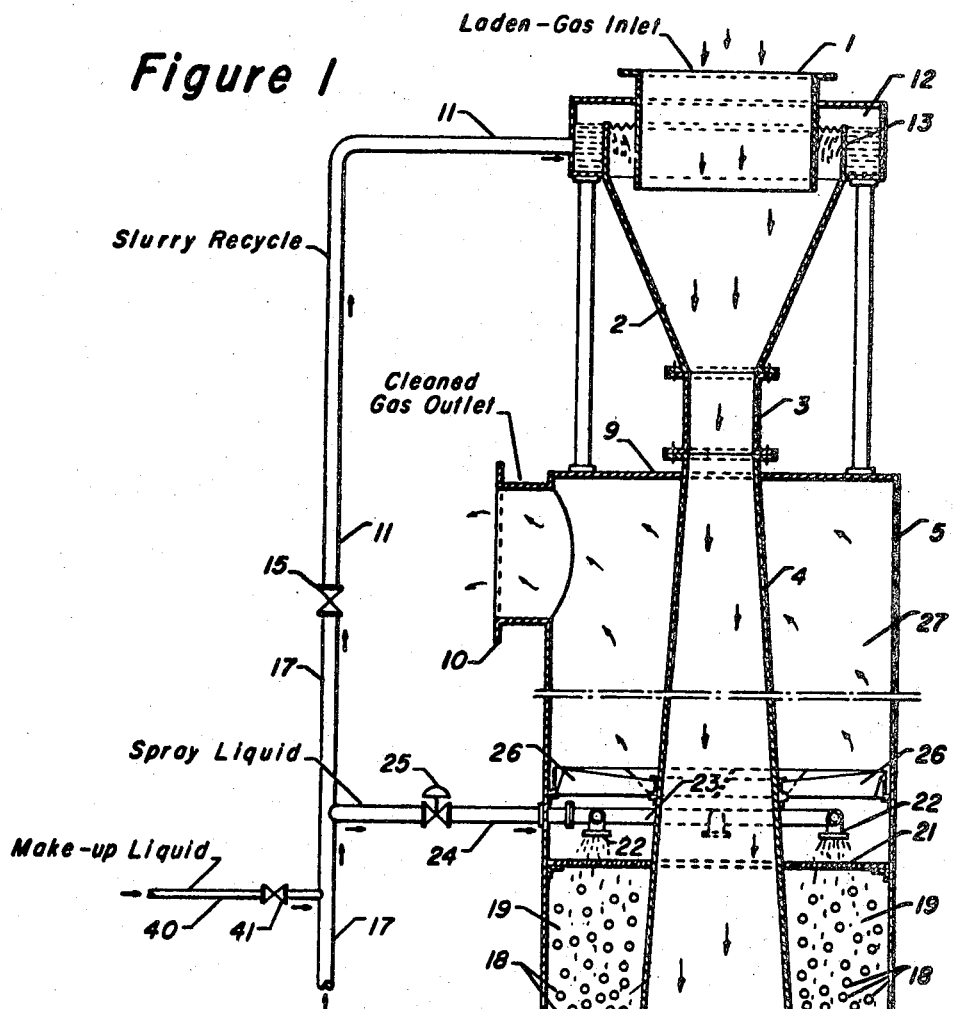
FIG. 1 of the drawing is a sectional elevational view indicating one simplified embodiment of the improved high energy two-stage venturi-scrubbing system.

Referring now particularly to FIG. 1 of the drawing there is indicated a vertically oriented combined unit having a flanged inlet means 1 for a particle laden stream and adapted to feed downwardly into a funnel shaped venturi inlet section 2 which in turn feeds into venturi throat section 3 and thence into diffuser section 4. The latter is shown to be positioned substantially axially within a vertically elongated housing section 5 which has a conically shaped lower end portion 6 to provide a liquid or slurry collection section 7. The lower end of the housing cone section 6 is provided with a slurry outlet means 8, while the upper portion of the housing 5 is provided with a top closure plate 9 which encompasses the diffuser section 4. Also, there is indicated an upper side outlet means 10 from housing 5 for the removal of the cleaned gas stream from the unit.

Various means or systems have been provided in combination with venturi-scrubber units to effect the introduction of a liquid stream into the funnel inlet section of the venturi or directly into the throat section thereof; however, a preferred arrangement provides for the uniform introduction of a liquid slurry stream over the entire venturi funnel section 2 so as to preclude the adherence or sticking of any particulates within the inlet section of the venturi. In the embodiment of FIG. 1 there is shown a slurry recycle line 11 feeding into a liquid reservoir section 12 such that there may be a 360° flow of liquid over a notched weir member 13 which is indicated as an upper extension of funnel section 2. Thus, in the operation unit, there will be a continuous flow of liquid down over the inside wall of venturi inlet section 2 and into the restricted area of venturi throat section 3. At this restricted area entrance to the venturi throat, the liquid or slurry and the laden gaseous stream will meet and proceed through the throat section under high pressure conditions. As a result, liquid droplets are formed and are caused to move rapidly with high velocity action from the gas stream such that there is instant saturation thereof. Also, there is a reduction in the temperature of such stream where it is being introduced as a hot gas. In any case, the entrained finely divided particles are in effect forced into contact with water particles or droplets such that all of the entrained particulates are directly wetted and caused to subsequently agglomerate.

Once the laden gas stream and saturated particles leave the venturi throat section and carry down through the diffuser tube there is some regain of energy, which may be of the order of 20 percent to 30 percent, or more, of the pressure drop which was sustained across the venturi throat section 3. The saturated gas stream and the wetted particulates are continuously discharged from the lower end of the diffuser tube 4 at a high velocity such that most of the particulates and excess water is caused to impact with the liquid interface in the collection zone 7. For example, the stream leaving the lower end of diffuser tube 4 may be of the order of 4,000 feet per minute and the mean velocity reaching the gas-liquid interface at the top of the sump section 7 may be of the order of 2,500 feet per minute.

In order to preclude the liquid level in sump section 7 from being excessive, there will be a constant withdrawal of slurry from the outlet means 8 and, where desired, a suitable liquid level controlling means associated with the lower end of the housing 5. The present embodiment of FIG. 1 indicates a slurry withdrawal line 14 that connects with suitable pump means 16, which in turn discharges into line 17, with valve 15, for effecting a recycle of slurry to the upper end of the unit and into the venturi funnel section 2. In this instance, slurry discharge from the unit is indicated by way of line 38 and valve 39 with the latter being controlled responsive to a liquid level control system LLC. Also, liquid make-up for the system is indicated as being made by way of line 40 and valve 41 into the slurry recycle line 17.

In accordance with a novel feature of the present improved system, there is effected a 180° reversal in direction for the gaseous stream leaving the lower end of the diffuser tube 4 such that the gas stream necessarily passes upwardly through a multiplicity of mobile contact elements 18 maintained in a contact zone 19. In this instance, there is shown a lower perforate plate 20 and an upper screen or perforate retainer plate 21. In operation, the upflowing gaseous stream with liquid droplets and some remaining entrained particles will cause the turbulent random motion of the light weight fluidizable fluid contact elements 18 in the presence of a descending liquid flow maintained from spray nozzles or other distributor means 22. The latter are spaced around and above annular contact zone 19 so as to provide a uniform distribution of contact liquid through the entire zone and in turn insure the desired counter-current scrubbing effect over the surfaces of all of the multiplicity of elements 18. The distributors 22 are indicated diagrammatically as depending from an internal distributor or header means 23 which in turn connects with a suitable liquid inlet line 24 having control valve means 25.

The gaseous stream reaching the upper end of the annular contact zone 19 preferably passes through or over a flow deflecting means, such as a plurality of spaced vanes 26 which are arranged in a radial pattern to provide a spiralling or spinning flow for the upwardly moving gas stream whereby there is a resulting spin-out of any entrained water droplets to the inside wall surface of zone 27 prior to the discharge of the cleaned gas stream by way of outlet means 10. In other words, the vanes or spinner means 26 will provide a further de-entrainment of water in the elongated upper spin-out section 27 and such water that is collected along the inner wall of the housing portion of housing 5 will drain down into the lower portion of the unit through the mobile packing stage 19.

The spheres or other contact elements which are maintained in the second stage contact section 19 of the multiple stage scrubber system may be of a size generally from about ½ inch to about 3 inches in diameter, with the optimum size being selected with regard to the size of the chamber or the size of the contact section being used in the system. There may be a variety of shapes and sizes and various materials for the elements; however, conventionally they will consist of plastic hollow spheres or hollow balls being formed from a thin polypropylene wall or skin. These spherical shapes may of course be made of foamed polystyrene or of perforated polyethylene such that there is some additional surface area resulting from internal surfaces of each element. The spheres are preferably of low density so that they will respond readily to the up flowing gaseous stream and can be easily fluidized and maintained in a random motion. Actually they can move up and down between the spaced perforate members in the housing, but normally will be prevented from contacting the upper perforate member of any one section by virtue of the downward liquid flow. Generally, the contact elements will have a density of less than about 20 pounds per cubic foot and preferbaly be within a range of about 2 pounds to about 11 pounds per cubic foot. On the other hand, where corrosive gaseous streams are encountered or where there is a high temperature stream which may be excessive for polypropylene types of materials, then it may be advisable to use hollow spheres or other types of contact elements which are formed or fabricated to have a low density and are made from stainless steels, aluminum, magnesium and the like.

In order that the elements remain in a desired random motion while the countercurrent flow is being carried out, it is of course necessary that the flow rates or velocities of both the gas and liquid streams be properly regulated. Also, generally the spheres or other contact elements will occupy less than 50 percent of the volume or open space of a contact section. As an upper limit, gas velocities will be adjusted to preclude lifting the spheres against an upper barrier so that there may be maintained a random motion of each of the inividual elements. Generally, gas flows through each contact section will be of the order of 500 to 1000 feet per minute, while the liquid flowing downwardly through the unit will be of the order of 5 to 100 gallons per minute per square foot of cross-sectional area. For example, in one operation having a liquid flow of about 45 U. S. gallons per minute and utilizing polypropylene spheres of 1 ½ inch diameter, with the volume of the spheres comprising about 15 percent of the total volume of a contact section, there was initial random movement of the spheres at about 500 feet per minute gas velocity and no total lifting of the movable bed against the upper barrier for a velocity of about 800 feet per minute.

In order that suitable random motion of the spheres may be attained in any given sections, it is desirable that there be adequate spacing between screens or grids. For example, spacing between grids will normally be of the order of 3 feet or more and preferably of the order of 4 feet.

Figure 2:
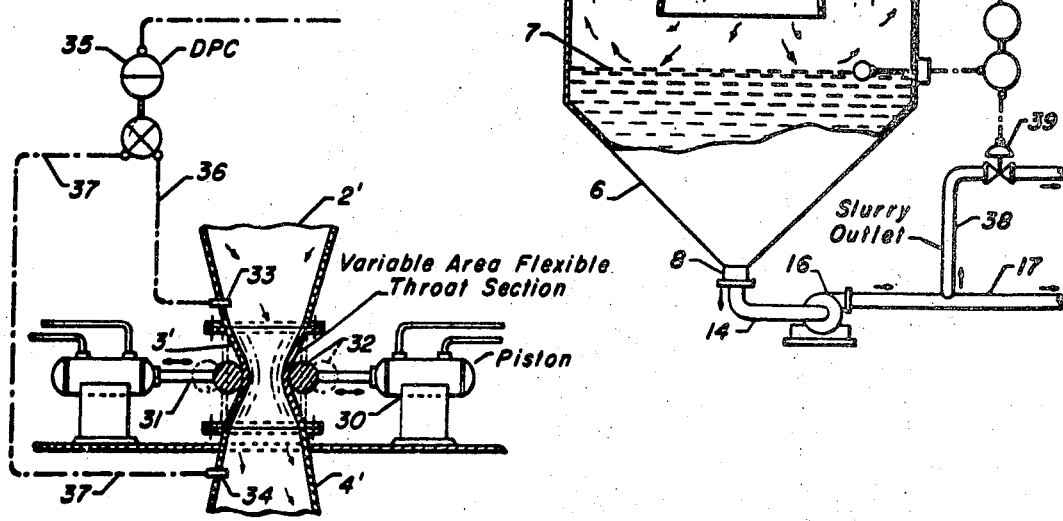
FIG. 2 of the drawing indicates in a partial sectional view and in a diagrammatic manner the utilization of automatically movable piston means to vary the cross-sectional area through a flexible throat section of the unit.

Referring now particularly to FIG. 2 of the drawing, there is indicted a partial elevational view for a modified type of two-stage system where a flexible throat section 3' is caused to be varied in cross-sectional area respective to movement from suitable automatically operating mechanical means such as cylinder means 30 in turn operating reciprocating type piston rods 31 and constriction arms 32. As illustrated in connection with FIG. 1, the upper funnel section 2' carries a laden gaseous stream along with a sutable quantity of scrubbing liquid down into the throat section 3' to effect high velocity, high energy wetting of particulates which in turn will carry on down stream through an elongated diffuser section 4' to permit liquid and particle collection in a lower sump or slurry collection zone. A second stage of liquid scrubbing in a turbulent contact element scrubber zone will again have an upward gas flow in a manner similar to that previously described.

Diagrammatically, there is indicated the use of suitable pressure tap means 33 and 34 across the throat of the venturi such that there may be a continuous indication of pressure drop occuring in the venturi section of the unit whereby the area of the throat section 3' may be regulated to maintain a desired constant pressure drop through the system. A differential pressure controller means 35 is shown connecting with pressure taps 33 and 34 through the respective lines 36 and 37 such that there may be the automatic regulation and adjustment of cylinder means 30 by suitable hydraulic lines, air lines, or other conventonal means, to in turn provide for the desired adjustment of piston rod means 31 and throat moving elements 32.

For the collection of substantially uniformly sized fine particles, which may be plus-micron or sub-micron in size, there will generally be a substantially fixed setting for the venturi throat section; however, where gas and liquid flow rates may vary somewhat then the cylinder and piston means will adjust to in turn cause a variation in the cross-sectional area through the venturi throat section and maintain the desired substantially constant pressure drop through the venturi stage. On the other hand, as pointed out hereinbefore, where the unit is to accommodate varying sized fine particulates, there may be an adjustment of the flexible throat section so it can be decreased in size and provide higher pressure drop where more finely divided particles are to be passed through the unit in a laden gas stream. Conversely, the throat section may be enalrged to accommodate a gaseous stream carryng larger sized particulates inasmuch as less pressure drop seems to be required to effect an efficient scrubbing in a venturi type scrubbing system.

It will be noted that the embodiment of FIG. 1 provides an axial postion for the venturi section within a housng 5 such that there is resulting annular shaped second stage scrubbing zone for accommodating the movable contact elements 18 in the second stage counter-current scrubbing section. However, in a modified construction of the system, there may be a side by side relationship and still provide for a 180° reversal in the gas flow from the lower end of the venturi diffuser and upwardly through the second stage contact section. In other words, the mobile packing, such as spheres 18 may be retained in an upflow path lying adjacent the diffuser tube means, rather than encompassing it, whereby the stream moves in a resulting "U" flow down through the first stage venturi section and upwardly through the mobile packing section. It will be obvious that still other mechanical modifications may be made within various portions of the entire system, as, for example, different kinds of vanes and deflector means may be utilized in lieu of the radially positioned deflector plate means 26 to effect the desired spiral flow of "spin-out" of water droplets in a de-entrainment section ahead of the cleaned gas outlet means. In any case, it is preferred, in accordance with the present invention, to preclude the use of mesh or other blanket type mist extraction means, as well as to preclude the use of fixed-bed or packed contact zones, so that there is the elimination of any sections with will require periodic cleaning of entrapped particulates.

EXAMPLE OF OPERATION

As a specific example of the operation of the two-stage high energy venturi-scrubber system, there may be the scrubbing of a hot gas stream in the 400° to 600°F. temperature range carrying entrained time particles from a kiln. The laden gas stream will carry down through the unit to enter the venturi funnel at a velocity of the order of 3,300 feet per minute. Recirculated slurry is introduced into the top end of the funnel, at a rate of approximately 10 gal/1000CF of saturated gases. The liquid slurry is obtained from the lower end of the unit, and may contain some 20 percent to 30 percent of solids in the recirculated slurry stream carrying down into the funnel section.

Preferably, the pressure drop through the venturi section is of the order of 15 inches of water for this particular service which will in turn insure an approximate 99 percent collection efficiency. By utilzing an elongated diffuser tube from the venturi throat section there may be an energy regain of the order of 20 to 30 percent so that there is only an overall approximate 10 to 12 inches of water pressure drop for the stream leaving the venturi diffuser section. The velocity of the mixed phase stream contacting the liquid level of the slurrry collection zone at the lower end of the unit is of the order of 2,500 feet per minute so that a majority of the wetted solid particles are deposited and entrapped in this lower sump section. The reverse upward flow of the gas stream through the enlarged cross-sectional area provided by the mobile contact elements in the second stage of scrubbing is somewhat reduced and generally of the order of 1,000 feet per minute but may be in the range of about 500 to 1,000 feet per minute. The mobile packing in the turbulent scrubbing section may, for example, comprise light weight polyethylene spheres of approximately 1 ½ inches in diameter such that they must be in a static depth of approximately 12 inches in a zone providing 3 feet to 4 feet between upper and lower retaining screens. The liquid introduced to the top of the countercurrent mobile contact element section will be of the order of 5 to 10 gallons per minute for each 1,000 cubic feet per minute of inlet gas. As noted hereinbefore, a particular advantage of the countercurrent scrubbing in the presence of the mobile contact elements further result in a constant scrubbing together of such elements and the relatively large surface area that they provide for contact with the upwardly moving gas stream and the continuously descending liquid stream will carry along to the lower end of the scrubber section any entrained and wetted particulates that would otherwise carry upwardly to the outlet section of the unit.

As a result of the two-stage of scrubbing as provided by this present compact unitary system there is a highly efficient 99 percent overall removal of both the plus-micron and sub-micron particles from the gas stream.

We claim:

1. A process for the multiple stage scrubbing and cleaning of a particle laden gaseous stream, which comprises the steps of passing such laden stream downwardly into a wetted wall funnel section and through a venturi section form mixing zone to effect the mixing of liquid with entrained particles of the stream, continuing the downward flow of the resulting wetted stream and particles through an elongated and downwardly extending tubular form energy regain zone, discharging the gaseous stream from the lower end of the latter with a resulting high velocity impact force upon the surface of a body of liquid being maintained closely adjacent such lower end of the energy regain zone, the mean velocity of said gaseous stream at point of impact on said surface being of the order of 2,500 feet per minute and such as to deposit and entrap a majority of said particles in said adjacent liquid, effecting 180° reversal in direction of flow of said stream and passing said reversed flow of said stream upwardly through at least one superposed scrubber-mist extraction zone having a multiplicity of low density mobile contact elements therein, and discharging a resulting clean gaseous stream from above the last said zone.

2. The process of claim 1 further characterized in that a controlled quantity of liquid from the body thereof adjacent the lower end of the energy regain zone is withdrawn and passed to distribution means at the upper end portion of the funnel section to thereby supply the liquid for mixing with the gaseous stream in venturi mixing zone.

3. The process of claim 1 further characterized in that a controlled quantity of liquid from the body thereof adjacent the lower end of the energy regain zone is withdrawn and passed to distribution means positioned above the contact elements in said scrubber-mist extraction zone, whereby to provide additional scrubbing liquid to such zone, and the gaseous stream therfrom is passed upwardly through a succeeding mist-extraction zone.

4. The process of claim 1 further characterized in that the gaseous stream flow rate through the scrubber-mist extraction zone and the quantity of elements therein are adjusted to effect a fluidized and turbulent random motion for said elements while in the presence of any descending liquid flow through such zone.

5. The process of claim 1 further characterized in that the gaseous stream reverse upward flow through the scrubber-mist extraction zone is at a high velocity in the range of about 500 to 1000 feet per minute to effect turbulent random movement of said low density contact elements.

* * * * *